United States Patent [19]

Nakamura

[11] 4,396,257

[45] Aug. 2, 1983

[54] ZOOM BINOCULAR WITH GEAR DRIVE ABOUT CENTRAL PIVOT AXIS

[75] Inventor: Masakazu Nakamura, Tokyo, Japan

[73] Assignee: Enshu Optical Co., Ltd., Japan

[21] Appl. No.: 305,041

[22] Filed: Sep. 23, 1981

[51] Int. Cl.³ ............................ G02B 7/04; G02B 7/12
[52] U.S. Cl. .................................................. 350/552
[58] Field of Search ............... 350/552, 550, 548, 549, 350/145, 560, 563, 564, 565

[56] References Cited

U.S. PATENT DOCUMENTS 4,171,865 10/1979 Kamakura ........................... 350/552

Primary Examiner—Jon W. Henry
Attorney, Agent, or Firm—McGlew and Tuttle

[57] ABSTRACT

An improvement in zoom binoculars is disclosed which utilizes a small gear rotated by a larger drive gear connected to a pivotally mounted lever for transmitting rotation to one of two intermediate gears which are meshed to each other through free central gear. Each intermediate gear is meshed with a tube gear connected to a tube lens. Each intermediate gear with its meshed tube gear is rotatably mounted on one of a pair of binocular body portions which are pivotally mounted to each other. The pivotally mounted body portions can be pivoted with respect to each other to change the spacing between lens tubes. Due to the small size of the small gear, such pivoting of the body portions produces only a small differential rotation between the two intermediate gears, and thus a small differential and magnification throughout the entire range of magnification for the zoom binoculars.

5 Claims, 4 Drawing Figures

4,396,257

ZOOM BINOCULAR WITH GEAR DRIVE ABOUT CENTRAL PIVOT AXIS

FIELD AND BACKGROUND OF THE INVENTION

The present invention relates in general to binoculars and in particular to a new and useful drive arrangement for zoom type binoculars which include a lever which can be operated to change the magnification of the binoculars.

Reference is now made to FIG. 1 which is a front elevational view of conventional zoom type binoculars showing the zoom (gear) mechanism. The binocular body comprises a pair of body portions 50 and 50' which are pivotally mounted to each other. A central gear 20 is rotatably mounted near or at the pivot axis between body portions 50 and 50'. Central gear 20 is directly rotated by a pivotally mounted operation lever 21 connected to the central gear 20. Left and right tube gears 30 and 30' are provided which are connected to respective left and right lens tubes. Tube gears 30, 30' are adapted to be driven by central gear 20 through intermediate gears 40, 40', respectively. An adjustment of magnification is thus provided in known fashion.

In the case of zoom binoculars of this type, which include an operating lever disposed at the center of the binocular body, the rotation angle of the lever is usually limited to about 60°. For this reason, a sufficiently large rotation of tube gears 30, 30' cannot be obtained unless the diameter of the central gear 20 is large. The central gear 20 must, therefore have a large diameter.

This, however, raises another problem in the overall operation of the zoom binocular. Specifically, with the central gear 20 assumed to be fixed, the intermediate gear 40 is rotated to a large extent in the direction of arrow A when the distance between the two lens tubes is adjusted to meet varying distance between the eyes of different users. This adjustment is illustrated by the dot-dash line in FIG. 1 which indicates the position of the left body portion 50 after it has been moved in the direction of arrow B. With the movement of body portion 50 in the direction of arrow B, and the resulting rotation of intermediate gear 40 in the direction of arrow A, tube gear 30 is rotated counterclockwise to cause a corresponding change in magnification on the left side of the binocular. This increases the difference of magnification between the two lens tubes and the two sides of the binocular.

An increased size of the central gear 20 which is required also raises problems in operating the zoom binoculars in that the larger diameter gear causes a greater resistance in the manipulation of the operating lever 21.

SUMMARY OF THE INVENTION

An object of the present invention is to provide a zoom binocular having a zoom mechanism which improves, that is minimizes, the difference in magnification between the two lens tubes.

Another object of the invention thus is to provide an improvement in zoom binoculars having a body with a pair of body portions pivotally connected to each other and a lens tube with a tube gear rotatably mounted to each body portion, comprising, an operating lever pivotally mounted to the body, a drive gear operatively connected to the operating lever for rotating the drive gear, a small gear which is small with respect to the diameter of the drive gear meshed with the drive gear, an intermediate gear shaft connected to each body portion, an intermediate gear mounted on each intermediate gear shaft and meshed with one gear tube, the small gear mounted on one of the intermediate gear shafts for rotation with the intermediate gear of that one shaft, and a free central gear meshed with both the intermediate gears for transmitting rotation of one intermediate gear to the other intermediate gear.

Another object of the invention is to provide a zoom mechanism for zoom type binoculars which are simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
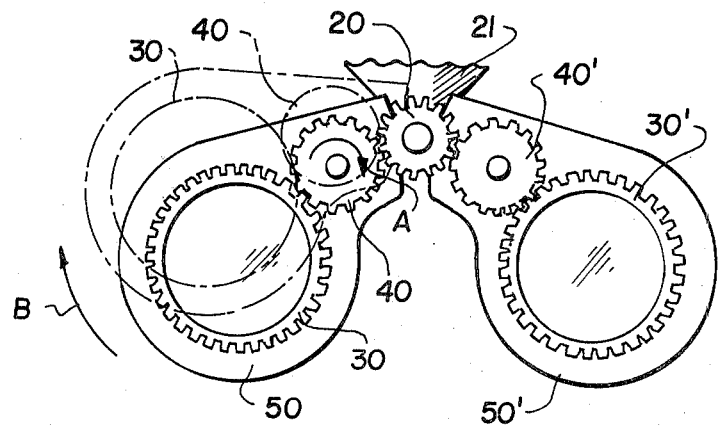
FIG. 1 is a front elevational view of a conventional zoom type binocular having an intermediate operating lever.
Figure 2:
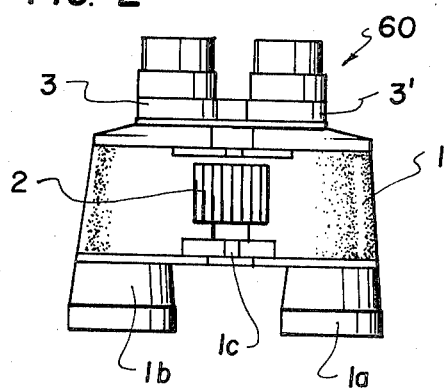
FIG. 2 is a top plan view of a zoom binocular in accordance with the invention.
Figure 3:
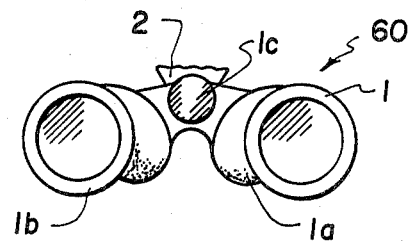
FIG. 3 is a front elevational view of the zoom binocular shown in FIG. 2.

Referring to the drawings in particular, the invention embodied therein, in FIG. 2, comprises an improvement in the zoom mechanism of zoom binoculars generally designated 60 which include a body 1 made of two body portions 1a and 1b. Body portions 1a and 1b are pivotally connected to each other at 1c. The zoom binocular 60 includes an operating lever 2 which is pivotally mounted to the body 1 near the pivotal connection 1a. Each body portion 1a, 1b includes tubes 3, 3'.

Figure 4:
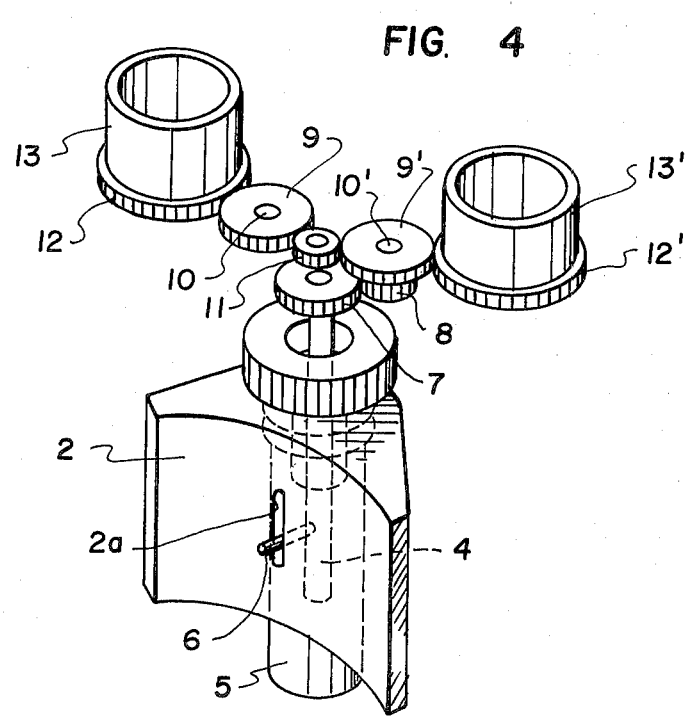
FIG. 4 is a perspective view of an operating lever and a gear mechanism connected to the lever in accordance with the invention.

Referring to FIG. 4, a drive shaft 4 is rotatably mounted in the binocular body 1, and connected by a pin 6 to operating lever 2. Pivotal movement of operating lever 2 thus will rotate shaft 4. Pin 6 extends through an elongated slot 2a of lever 2 to permit relative axial movement between shaft 4 and lever 2 which is necessary for focusing functions and the like which are known per se.

A drive gear 7 is fixed to shaft 4 and meshed with a small gear 8, which has a diameter which is small with respect to the drive gear 7. Small gear 8 is fixed to a shaft 10' connected to the body portion 1b. Shaft 10' carries an intermediate gear 9' so that gears 9' and 8 rotate in unison. Another intermediate gear 9 is provided and mounted on another intermediate gear shaft 10 which is associated with the other body portion 1a. Intermediate gears 9, 9' are engaged with each other through a free central gear 11 which is rotatably mounted to the binocular body 1. Central gear 11 is free to rotate independently of drive gear 7.

Tube gears 12,12' are provided which are each fixed to a respective inner or lens tube 13, 13' associated with the respective tubes 3,3' of the respective body portions 1b and 1a.

In operation, operating lever 2 is rotated and a torque is transmitted from drive shaft 4 to tube gears 12,12' through the drive gear 7, the small gear 8, the intermediate gear 9', the central gear 11 and the intermdediate gear 9. This rotation affects the adjustment magnification of the zoom binocular 60.

Small gear 8 may be fixed to shaft 10 of intermediate gear 9 rather than shaft 10'.

As can be understood from the foregoing description, according to the invention, the driving gear system for transmitting the torque from the operating lever 2 is changed to the combination of drive gear 7, small gear 8 and the intermediate gear 9', in contrast to the conventional binocular in which the central gear 11 is used as the drive gear. In the binocular of the present invention therefore, the central gear 11 has a function of merely giving a direction of rotation, so that it can be made of any, preferably a small diameter.

Consequently, when the distance between the two tubes 3,3' is to be adjusted by a relative pivoting between body portions 1a and 1b, the angle of rotation of intermediate gears 9, 9' is reduced, due to the corresponding reduction in the diameter of the central gear 11. The smallness of the diameter of small gear 8 also constributes to this reduced relative rotation between intermediate gears 9,9'. The difference in magnification between the two tubes is thus made substantially smaller than in conventional binocular designs. This reduction in differential takes place throughout the entire range of magnification from maximum to minimum, and particularly in the intermediate area of this range.

While a specific embodiment of the invention has been shown and described in detail to illustrate the application of the principles of the invention, it will be understood that the invention may be embodied otherwise departing from such principles.

What is claimed is:

1. In a zoom binocular having a body with a pair of body portions pivotally connected to each other and a lens tube with tube gear rotatably mounted to each body portion, an improvement comprising:
    an operating lever pivotally mounted to the body;
    a drive gear operatively connected to said operating lever for rotation of said drive gear with pivoting of said lever;
    a small gear which is small with respect to said drive gear meshed with said drive gear;
    an intermediate gear shaft connected to each body portion;
    an intermediate gear mounted to each intermediate gear shaft, each meshed with one tube gear;
    said small gear mounted on one of said intermediate gear shafts for rotation of an intermediate gear mounted on said one intermediate gear shaft with rotation of said small gear; and
    a free central gear meshed with both said intermediate gears for transmitting rotation of one of said intermediate gears to the other of said intermediate gears.

2. In a zoom binocular, an improvement according to claim 1, wherein said small gear is integrally connected to said one intermediate gear.

3. In a zoom binocular, an improvement according to claim 2, wherein each of said intermediate gear shafts are rotatably mounted to a respective one of the body portions and each respective intermediate gear is fixed to its intermediate gear shaft.

4. In a zoom binocular, an improvement according to claim 1, including a drive shaft connected to said drive gear, a pin extending radially from said drive shaft, said operating lever including a slot extending axially therein with respect to said drive shaft, said pin extending in said slot to transmit pivotal movement of said operating lever into rotational movement of said drive shaft and drive gear.

5. In a zoom binocular, an improvement according to claim 1, wherein said free central gear is small with respect to said drive gear.

* * * * *